Aug. 14, 1951 J. H. WILSON 2,564,183
FINGER STALL
Filed Dec. 17, 1948

Inventor
JAMES H. WILSON
By
Young, Emery & Thompson
Attys.

Patented Aug. 14, 1951

2,564,183

UNITED STATES PATENT OFFICE 2,564,183

FINGER STALL

James Henderson Wilson, Dunedin, New Zealand

Application December 17, 1948, Serial No. 65,765
In New Zealand December 10, 1947

1 Claim. (Cl. 128—157)

This invention has been devised with the object of providing a new manner of forming a finger stall or cot for the protection of a damaged finger or hand, in the use of which a firm antiseptic covering for the damaged part or tissue is ensured. The said manner of making the stall is such as to cause it in its use upon a finger or thumb, to provide a protective covering which will adapt itself to the shape of the part enclosed by it and will afford a shield against any shock or jar being transmitted to such damaged part or wound as the wearer uses his hand in the ordinary manner. The stall, as made in accordance herewith, is also capable of being used for covering parts of the hand either on the back or palm thereof. This stall, in addition, may be so made that an internal surgical cushioning lining or dressing having antiseptic properties, is provided.

In its general features of formation the stall or cot is made of the usual cylindrical shape characteristic of the formation of stalls generally, but with its wall and closed end built up of a series of overlapping layers of a suitable plastic material treated with an appropriate antiseptic medium, such layers being built up upon a textile gauze lining and being enclosed by a similar nature of covering, these being pressed together to form a homogeneous whole. The plastic material must be of such a nature that when the stall is compressed upon a finger or thumb, or is opened out to cover a portion of the hand, as hereinafter referred to, it will conform to the shape of the surface it covers when compressed round it or pressed upon it. A plastic material suitable for the purpose is wood pulp plastic with which a liquid disinfectant or antiseptic material has been incorporated.

In a suitable process for the manufacture of the stall, it is moulded upon a core or mandrel of a diameter and length to suit the requirements of each instance, and the plastic layers formed, for each layer, by a number of strips of the plastic material arranged edge to edge to extend lengthwise of the mandrel in a helical manner. The strips of each succeeding layer are caused to overlap the adjacent edges of the layer beneath. These strips may be laid around the mandrel by being sprayed in the semi-liquid state of the plastic material, or may be composed of preformed strips of such material. These layers are arranged upon the gauze lining, which is first wrapped around the mandrel, and are then overlaid by a wrapping of the textile gauze material and the whole mass compacted. The closed end of the stall is made by folding the ends of the layers and wrapping around a domed end of the mandrel. When the formation is finished, the outer surface may be covered by a suitable antiseptic sealing composition. The said manner of forming the closed end of the stall will result in a pad being formed which when the stall is in use upon a finger or thumb will act to cushion such finger or thumb against any jar or shock.

In the making of the stall it is preferably made with an encircling reinforcing band or ring at a selected point in its length to cause it when the stall is in wear to be above the first joint of the finger. Such band or ring is formed by a strip of fabric material laid between the outside layer of the stall and the textile gauze covering. A stall, as thus made, is adapted for use in respect of a covering for the band by cutting off its top end, splitting it longitudinally up from its other end to within a short distance from its top (thereby leaving a ring portion at such end) and then by transverse cuts from the split extending in both directions around the stall for distances such as to leave a part connecting with the ring forming portion. When these split parts are opened out from each other they form a pad which may be used to cover any desired part of the hand, being disposed in place by passing the ring portion over the appropriate finger or thumb of the hand so that the pad extends downwardly therefrom. Binding tapes may then be used for fastening the pad down upon the hand.

To provide for a fuller understanding of the invention reference is made to the accompanying sheet of drawings, in which.

Figure 3:
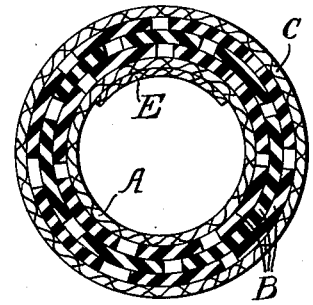
Figure 3 is a cross sectional view of the stall drawn upon an exaggerated scale.

The make up of the stall is more particularly shown in Figure 3 wherein the inside foundation lining is represented at A, the strips of plastic material at B and the outer textile covering at C.

Figure 1:
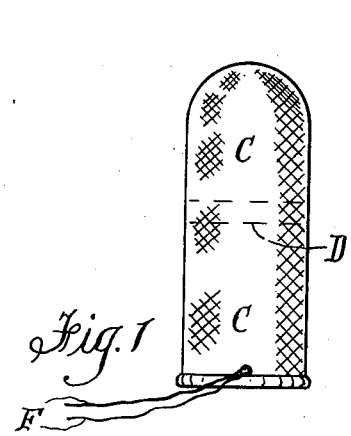
Figure 1 is an elevation of the completed stall.
Figure 2:
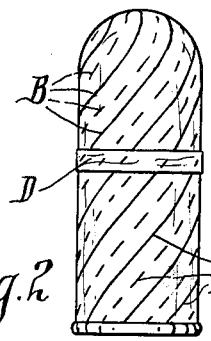
Figure 2 is a similar view but with the outside covering of textile gauze removed.

These members also are shown in the other figures. The reinforcing band is shown in Figures 1 and 2 and its position indicated in Figure 5 at D. When it is desired to increase the flexibility of the stall this band may readily be removed by slitting the fabric covering and drawing the band out.

Figure 6:
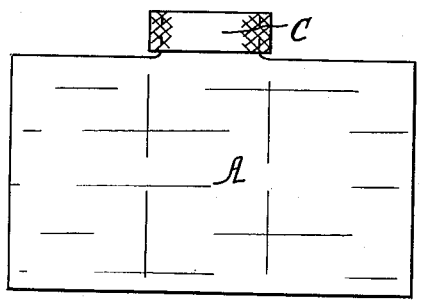
Figure 6 is a view of the stall when opened out to adapt it for forming a hand covering.
Figure 4:
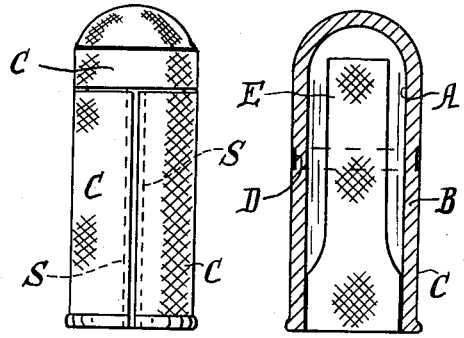
Figure 4 is a view of the stall showing the lines of cuts for adapting it for use in covering portions of the hand.

In Figure 4 the lines upon which the cuts are made to allow for the stall being opened up to form a hand covering pad as represented in Figure 6 are clearly shown.

To guide a user in making the longitudinal cut, two parallel rows of machine stitchings may be sewn to give an indication as to the line of cut being made between the two. These lines are shown in Figure 4.

Figure 5:
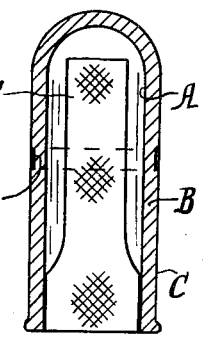
Figure 5 is a sectional elevation showing the manner in which the inside antiseptic dressing may be combined therewith.
Figure 7:
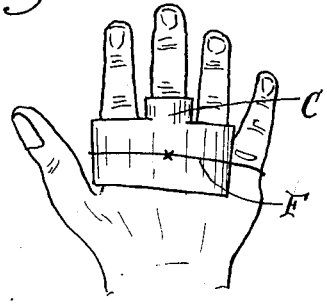
Figures 7 and 8 are sketches showing ways in which the stall may be used in covering respectively the back and outer edge of the hand.
Figure 8:
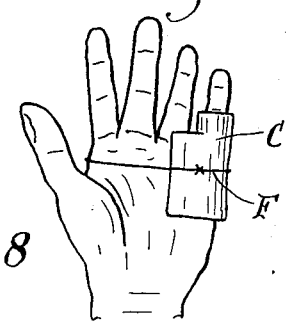

In the combination with the stall, of the antiseptic surgical dressing, such dressing is formed, as shown in Figure 5, of a wrapping of a suitable fabric or textile, shown at E, arranged inside the stall lining A and attached thereto for the part of its length, the outer part of extremity being left unattached. This provides that when a finger is inserted into the stall and through the wrapping, the wrapping will pack closely around the finger and form a cushion covering to protect the tissues of the injured part. This dressing member is arranged in position inside the stall lining by being first placed on the mandrel.

The stall, for its ordinary use, is provided at its inner end with tapes F (Figure 1) for use in securing it upon a finger by tying the tapes around the wrist.

I claim:

A finger stall comprising a cylindrical member closed at one end and composed of a number of layers of plastic material treated with an antiseptic medium, each of said layers being formed by strips of the plastic material of helical shape and disposed edge to edge to extend through the length of the layer, and each strip of one layer being disposed so that it overlaps the adjacent edges of those strips of the layers juxtaposed to said layer, a lining of textile gauze disposed within said cylindrical member, a covering of textile gauze surrounding said cylindrical member, and two parallel rows of stitching extending longitudinally up from the open end of said stall to within a short distance from the closed end of said stall, whereby said stall may be converted into a hand pad by cutting off the closed end of said stall, splitting said stall between the parallel rows of stitching, and cutting said stall transversely in both directions from the split for distances such as to leave a part connecting with the ring forming portion, said split being opened out from each other to form a pad, the ring portion being passed over the appropriaate finger.

JAMES HENDERSON WILSON.

REFERENCES CITED

The following references are of record in the file of this patent:

UNITED STATES PATENTS

| Number | Name | Date |
|---|---|---|
| 2,307,817 | Austin | Jan. 12, 1943 |
| 2,407,735 | Beckerman | Sept. 17, 1946 |
| 2,438,901 | Coxe | Apr. 6, 1948 |
| 2,440,235 | Solomon | Apr. 20, 1948 |

FOREIGN PATENTS

| Number | Country | Date |
|---|---|---|
| 122,183 | Switzerland | Sept. 1, 1927 |